Aug. 9, 1966  W. H. SWAN  3,264,899
FLUID LOCK DEVICE
Filed Jan. 13, 1964
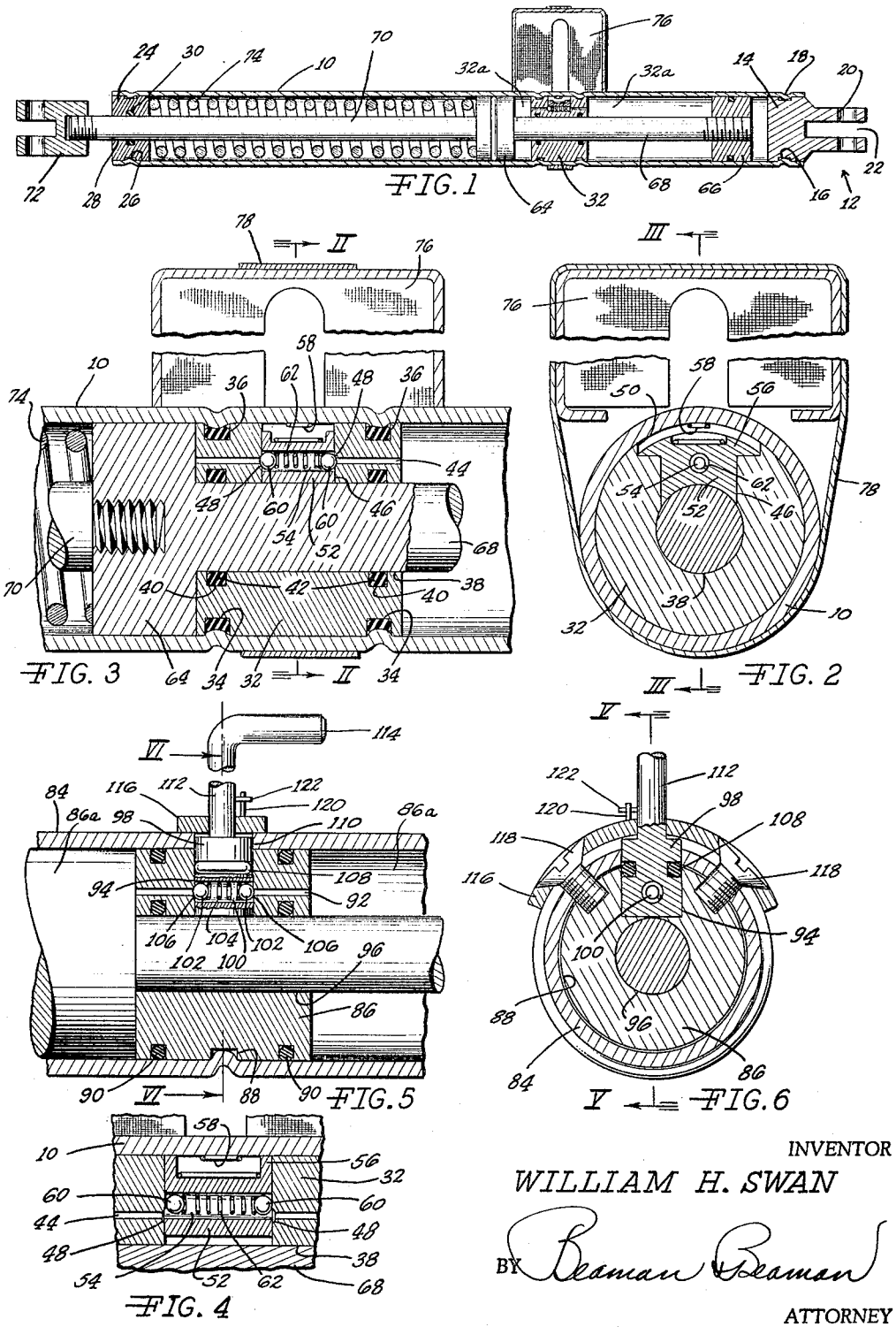
INVENTOR
WILLIAM H. SWAN
BY *Beaman Beaman*
ATTORNEY

United States Patent Office 3,264,899  
Patented August 9, 1966

3,264,899  
FLUID LOCK DEVICE  
William H. Swan, Quincy, Mich., assignor, by mesne assignments, to Hoover Ball and Bearing Company, Saline, Mich., a corporation of Michigan  
Filed Jan. 13, 1964, Ser. No. 337,192  
6 Claims. (Cl. 74—586)

The invention pertains to a fluid lock device and particularly relates to a self-contained fluid lock device incorporating novel valving structure.

Fluid lock devices wherein a fluid is employed to restrict relative movement between the components of the device are employed with many various types of adjustable mechanisms wherein infinite positions of adjustment are desired and wherein control of the rate of adjustment is of advantage. Such fluid lock devices find use in seat adjustments wherein the fluid lock is interposed between the back and seat portions locking the angular relationship of the seat back with respect to the seat, and the invention is particularly directed, but not limited, to a fluid lock device which is suitable for use in seat adjustment systems such as in vehicle seats.

It is an object of the invention to provide a fluid lock device of a concise and unitary construction incorporating a biasing spring wherein both the spring and a fluid chamber are housed within a common cylinder.

An additional object of the invention is to provide a fluid lock device having a fixed partition, and having pistons located on opposite sides thereof connected by a common piston rod wherein a flow control orifice is defined within the partition, and novel valve means are incorporated within the partition selectively permitting and preventing fluid flow through the orifice.

An additional object of the invention is to provide valve means for a fluid lock device which is of a simplified and readily manufacturable nature, and positively prevents fluid flow through an orifice controlled by the valve member.

Another object of the invention is to provide a fluid lock device employing a valve means within a cylinder whereby the valve means is operated by magnetic force and does not require a control element extending through the wall of the cylinder.

A further object of the invention is to provide a fluid lock device having a valve control system which may be readily adapted to either a magnetic or a manual operation.

These and other objects of the invention arising from the details and relationships of the components of embodiments thereof will be apparent from the following description and accompanying drawings wherein:

FIG. 1 is an elevational, diametrical, sectional view of a fluid lock device constructed in accord with the invention, FIG. 2 is an enlarged, elevational, sectional view of the invention as taken along section II—II of FIG. 3, FIG. 3 is an enlarged, detail, elevational, sectional view of the fixed partition and associated valve member illustrating the valve member in the "closed" position and a piston in engaging relationship with the partition, FIG. 4 is a detail, enlarged, sectional view of the valve member of FIG. 3 illustrating the valve member in the "open" position, FIG. 5 is an elevational, diametrical, detail, sectional view of another embodiment of the invention illustrating the valve member in the "closed" position, and FIG. 6 is an elevational, cross-sectional view of the embodiment of FIG. 5 taken along section V—V thereof.

The fluid lock device in accord with the invention includes a cylinder 10 wherein the open right end, as viewed in FIG. 1, is closed by an anchor 12, having a cylindrical portion 14 adapted to be received within the cylinder. An annular groove or recess 16 is defined about the portion 14 whereby the cylinder may be circumferentially indented at 18 into the recess 16 firmly affixing the anchor 12 to the cylinder. The anchor 12 includes a hole 20 and slot 22 arrangement whereby the anchor may be pivotally connected to seat structure or other mechanism with which the fluid lock device is to be employed.

The left end of the cylinder, FIG. 1, is closed by an annular spring abutment 24 having an annular recess 26 defined therein, whereby the cylinder 10 may be circumferentially indented into the recess maintaining the abutment in position. The abutment 24 is provided with an axial bore 28 for receiving the piston rod extension and includes a sealing ring 30.

A fixed piston or partition 32 is located within the cylinder 10 intermediate the anchor 12 and the spring abutment 24. As is apparent in FIG. 3, the partition 32 is of a cylindrical exterior configuration of a diameter only slightly less than that of the inner diameter of the cylinder. A pair of annular recesses 34 are circumferentially defined on the exterior surface of the partition and resilient sealing rings 36 are located therein. The cylinder 10 is circumferentially indented into the recesses 34 to compress the sealing rings 36 and thereby provide a very effective sealed connection between the cylinder 10 and the partition 32. Interiorly, the partition 32 is provided with a bore 38 having recesses 40 defined therein for receiving sealing rings 42 for sealing cooperation with a piston rod as will be later described.

The partition 32 includes an orifice 44 extending therethrough communicating with opposite sides of the partition. The diameter of the orifice is predetermined to produce the desired operating velocity of the fluid lock device during the adjusting movement.

A radially extending valve-receiving opening 46 is defined within the partition 32 intersecting both the outer surface and the bore 38 thereof. The opening 46 also diametrically intersects the orifice 44, producing a pair of opposed orifice seats 48, FIG. 3. As will be apparent from FIG. 2, the opening 46 is provided with a non-circular enlarged portion 50 adjacent the cylinder 10. A valve member 52 is loctaed within the opening 46 and is of a configuration which will be apparent from FIGS. 2 and 3, closely fitting the opening and including a head 56 received within opening portion 50. The valve member has a passage 54 defined therein which concentrically aligns with the orifice 44 and orifice seats 48 during the normally closed position of the valve member. The valve member head 56 is recessed to receive a spring, and a compression spring 58 interposed between the cylinder 10 and the valve member head biases the valve member to the normally closed position shown in FIGS. 2 and 3. It will be appreciated that rotation of the valve member relative to the partition 32 is prevented by the head 56.

A pair of ball check valve elements 60 are located within passage 54 and are radially biased outwardly by a compression spring 62 interposed between the ball elements. The ball elements 60 are of a diameter less than that of the passage 54, and each ball element sealingly cooperates with an orifice seat 48 during the normally closed position of the valve member 52, preventing fluid flow through the orifice 44.

The fluid lock device also includes a pair of pistons 64 and 66 located on opposite sides of the partition 32. The pistons 64 and 66 are interconnected by a piston rod 68 extending through the bore 38 of the partition. Sealing ring means are mounted on the pistons establishing a sealed relationship with the inner wall of the cylinder 10. A hydraulic fluids fills the chambers defined by the pistons and the partition 32.

The piston rod extension 70 is attached to the piston 64 by a thread, FIG. 3, and extends through the bore 28 of the spring abutment 24. The outer end of the extension 70 is provided with an anchor yoke 72, whereby the yoke may be attached to the seat structure or other mechanism employing the fluid lock device. A compression spring 74 is interposed between the piston 64 and the abutment 24, and is of sufficient length to bias the piston 64 into engagement with the fixed partition 32 as shown in FIGS. 3 and 5.

In the preferred embodiment illustrated in FIGS. 1 through 4, an electromagnet 76 is mounted to the exterior of the cylinder 10 by means of a strap 78, FIG. 2. The electromagnet 76 is connected with a suitable electrical power source, and is positioned on the cylinder 10 in radial and axial alignment with the valve member 52. In this embodiment, the cylinder 10, the partition 32, and the piston rod 68 are constructed of nonmagnetic materials such as nonferrous metals. The valve member 52 is formed of a metallic ferrous material such as steel. Upon energization of the electromagnet 76, the magnetic force imposed on the valve member 52 will lift the valve member toward the electromagnet into engagement with the inner cylinder wall to the position shown in FIG. 4. It will be noted that energization of the magnet moves the valve member toward the cylinder wall to an extent which removes the check valve ball elements 60 from their associated orifice seats 48, yet, the passage 54 will remain in alignment with the orifice 44 and permit the fluid to flow through the orifice. Thus, energization of the electromagnet 76 permits fluid flow through the partition 32, permitting axial movement of the piston rod 68 and the extension rod 70 relative to the cylinder 10.

De-energizing the electromagnet 76 permits the spring 58 to return the valve member 52 to the normal closed position shown in FIGS. 2 and 3, realigning the check valve ball elements 60 with the orifice seats 48 and restricting further fluid flow through the orifice 44. It will be appreciated that extension of the fluid lock device will be resisted by the compression spring 74 and retraction of the device will be assisted by the spring. As the partition 32 is sealed with respect to the cylinder 10 and piston rod 68, fluid flow past the partition is limited to that passing through the orifice 44 and is, thus, fully under control of the valve member 52.

If desired, a movably mounted permanent magnet may be associated with the cylinder 10, to operate the valve member 52, in place of electromagnet 76.

The embodiment illustrated in FIGS. 5 and 6 employs a manual actuation of the valve member to lock and unlock the fluid lock device, and this embodiment includes a cylinder 84 which may be provided with anchors, spring abutments, springs, extension rods, and attachment yokes in the manner of the embodiment of FIG. 1. The partition 86 of the embodiment of FIGS. 5 and 6 includes only a single annular recess 88 circumscribing the exterior cylindrical surface of the partition, whereby the cylinder 84 may be indented into the recess to fix the partition thereto. Grooves and sealing rings 90 seal the partition with respect to the cylinder. An orifice 92 is defined in the partition 86, establishing communication between opposite sides thereof, and the orifice is intersected by a radial, cylindrical opening 94 extending through the exterior surface of the partition and terminating short of the partition bore 96, FIG. 6.

A cylindrical valve member 98 is received within the opening 94 for rotative movement with respect to the partition. The valve member 98 includes a diametrical passage 100 having a pair of check valve ball elements 102 located therein which are biased radially outward by a compression spring 104. The elements 102 engage the orifice seats 106, and prevent fluid flow through the orifice upon concentric alignment of the passage 100 with the orifice 92. A sealing ring 108 is located within a groove circumscribing the valve member 98 to seal the valve member with respect to the partition. An opening 110 is defined in the cylinder 84 through which a stem portion 112 of the valve member extends, and a handle 114 extends therefrom permitting selective rotation of the valve member 98. The valve member 98 is maintained within the opening 94 by a cap segment 116 having an opening through which the valve member stem 112 extends. The cap segment 116 is attached to the cylinder and partition 86 by screws 118, as will be apparent by FIG. 6, and engagement of the enlarged portion of the valve member 98 with the underside of the segment 116 maintains the valve member within the opening 94.

Control of the fluid flow through the orifice 92 is determined by the rotative position of the valve member 98 within the partition 86. When it is desired to permit fluid flow through the orifice, the valve member is rotated slightly to unseat the ball elements 102 from their respective orifice seats 106, yet maintain the passage 100 in communication with the orifice. To prevent excessive rotation of the valve member 98 wherein the passage 100 would not be in communication with the orifice 92, a stop pin 120 may be mounted on the cap segment 116 for engagement by a pin 122 mounted on the valve member stem 112.

The use of the check valve ball elements provides a positive leakproof seal of the orifice regardless of the direction of fluid pressure within the orifice, thereby producing a fluid lock. An advantage of the fluid lock device embodiment of FIGS. 1 through 4 lies in the fact that the use of the electromagnet does not require an opening to be formed in the cylinder, thereby eliminating any possible source of fluid leakage, a most important consideration in fluid lock devices.

It can thus be seen that in both illustrated forms of the invention the partitions 32 and 86 are between and sometimes separate a pair of fluid chambers 32a (FIG. 1) and 86a (FIG. 5), respectively. The partition 32 has a passage means extending therethrough (heretofore labeled the orifice 44 and the passage 54 in valve member 52) having an intermediate portion (passage 54) and end portions, namely, the orifice portions at opposite ends of the passage 54, which are smaller in diameter than the intermediate portion. The junctures of the end portions and the intermediate portion form the seats 48 for the ball valves 60. The partition 86 is similarly constructed with the seats 106 for the ball valves 102 at the junctures of the passage end portions with the larger intermediate portion.

As a result, in this invention fluid communication between the chambers is prevented when the ball valves are seated. To provide for fluid communication of the chambers on opposite sides of the partition, the valve member 52 or 98 in which the intermediate passage portion is formed is moved, either transversely of the passage means (FIGS. 1–4) or rotated (FIGS. 5 and 6) enough to unseat the balls but still keep the intermediate passage portion in a position providing fluid communication between the passage end portions. Easily controlled and very effective valving is thus provided between the chambers separated by the partition 32 or 86.

It is to be understood that various modifications of the invention other than those disclosed may be apparent to those skilled in the art without departing from the spirit and scope thereof. It is intended that the invention be defined only by the following claims:

1. A fluid locking device comprising, in combination,
(a) an elongated tubular cylinder, having first and second ends,
(b) anchor means affixed to said cylinder first end, (c) a spring abutment affixed to said cylinder adjacent said second end, (d) a partition fixedly mounted within said cylinder intermediate the ends thereof and sealed with respect thereto, (e) a piston rod within said cylinder slidably extending through said partition and sealed with respect thereto, (f) a first piston within said cylinder and mounted on said piston rod intermediate said cylinder second end and said partition, (g) a second piston within said cylinder and mounted on said piston rod intermediate said cylinder first end and said partition, (h) a piston rod extension extending from said cylinder second end, (i) a compression spring within said cylinder operatively interposed between said spring abutment and said first piston, (j) an orifice defined within said partition establishing fluid communication between the cylinder chambers defined by said first piston and said partition, and said second piston and said partition, (k) an opening defined in said partition transversely intersecting said orifice, said opening defining a pair of orifice seats at the intersection with said orifice, (l) a valve member movably mounted within said opening having a passage defined therein adapted to align with said orifice at a first position of said valve member within said opening permitting fluid passage through said orifice, (m) a pair of check valve members within said passage, each check valve member adapted to sealingly cooperate with an orifice seat upon positioning said valve member to a second position preventing fluid flow through said orifice, (n) said cylinder and partition being formed of a non-magnetic material and said valve member being formed of a magnetic material, and (o) a magnet associated with the exterior of said cylinder disposed adjacent said partition and valve member adapted to selectively position said valve member between said first and second positions.

2. A fluid lock device comprising, in combination, (a) an elongated tubular cylinder having an inner wall, (b) first and second pistons slidably mounted within said cylinder sealingly cooperating with said inner wall, (c) a piston rod within said cylinder and coaxial therewith interposed between said pistons maintaining said pistons in spaced relationship, (d) a partition within said cylinder fixedly sealed with respect to said cylinder inner wall, an axial bore defined in said partition slidably and sealingly receiving said piston rod, (e) an axially extending orifice defined in said partition establishing fluid communication between the cylinder chambers defined by said first piston and said partition and said second piston and said partition, (f) a movable valve member mounted in said partition within said orifice controlling fluid flow through said orifice, said valve member being positionable between first and second positions, a passage defined in said valve member alignable with said orifice at both of said valve member positions, (g) a pair of check valve members within said passage adapted to sealingly engage said orifice at said first position of said valve member preventing fluid flow therethrough, said check valve member permitting fluid flow through said orifice at said second position of said valve member, (h) said cylinder and partition being formed of non-magnetic material and said valve member being formed of a magnetic material, and (i) magnet means affixed to the exterior of said cylinder adjacent said valve member, said magnet means selectively controlling the position of said valve member relative to said orifice.

3. A fluid lock device comprising, in combination, (a) an elongated tubular cylinder having an inner wall, (b) first and second pistons slidably mounted within said cylinder sealingly cooperating with said inner wall, (c) a piston rod within said cylinder and coaxial therewith interposed between said pistons maintaining said pistons in spaced relationship, (d) a partition within said cylinder fixedly sealed with respect to said cylinder inner wall, an axial bore defined in said partition slidably and sealingly receiving said piston rod, (e) an axially extending orifice defined in said partition establishing fluid communication between the cylinder chambers defined by said first piston and said partition and said second piston and said partition, (f) a movable valve member mounted in said partition within said orifice controlling fluid flow through said orifice, said valve member being positionable between first and second positions, a passage defined in said valve member alignable with said orifice at both of said valve member positions, (g) a pair of check valve members within said passage adapted to sealingly engage said orifice at said first position of said valve member preventing fluid flow therethrough, said check valve member permitting fluid flow through said orifice at said second position of said valve member, (h) said valve member being of a cylindrical configuration and said passage being transversely related to the axis of said valve member and diametrically extended therethrough, said valve member being rotatably supported within said partition, (i) an opening defined in said cylinder in alignment with the axis of said valve member, and (j) a control handle affixed to said valve member extending through said opening defined in said cylinder.

4. In a fluid lock device, means forming a pair of fluid chambers, partition means between said chambers, passage means in said partition means extending between said chambers, said passage means including an enlarged intermediate portion and end portions smaller in diameter than said intermediate portion at the junctures of said end portions with said intermediate portion, ball check valves in said intermediate portion, each of said ball valves being of a diameter less than the diameter of said intermediate portion, spring means in said intermediate portion urging said valves into seating engagement with said passage portion junctures, and means for moving said intermediate passage portion relative to said end portions sufficiently to unseat said valves and retain said intermediate portion in a position in which it provides fluid communication between said passage end portions.

5. In a fluid lock device, means forming a pair of fluid chambers, partition means between said chambers, passage means in said partition means extending between said chambers, said passage means including an enlarged intermediate portion and end portions smaller in diameter than said intermediate portion at the junctures of said end portions with said intermediate portion, ball check valves in said intermediate portion, each of said ball valves being of a diameter less than the diameter of said intermediate portion, means in said intermediate portion urging said valves into seating engagement with said passage portion junctures, and means for moving said intermediate passage portion transversely thereof relative to said end portions sufficiently to unseat said valves and retain said intermediate portion in a position in which it provides fluid communication between said passage end portions.

6. In a fluid lock device, means forming a pair of fluid chambers, partition means between said chambers, passage means in said partition means extending between said chambers, said passage means including an enlarged intermediate portion and end portions smaller in diameter than said intermediate portion at the junctures of said end portions with said intermediate portion, each of said ball valves being of a diameter less than the diameter of said intermediate portion, means in said intermediate portion urging said valves in seating engagement with said passage portion junctures, and means for rotating said intermediate passage portion relative to said end portions sufficiently to unseat said valves and retain said intermediate portion in a position in which it provides fluid communication between said passage end portions.

References Cited by the Examiner

UNITED STATES PATENTS

| | | | |
|---|---|---|---|
| 1,273,059 | 7/1918 | Hild | 188—98 |
| 2,372,408 | 3/1945 | Trich | 137—512.5 |
| 2,989,299 | 1/1961 | Modrich | 188—98 |

MILTON KAUFMAN, *Primary Examiner.*

BROUGHTON G. DURHAM, *Examiner.*

W. S. RATLIFF, *Assistant Examiner.*